US012643171B2

(12) United States Patent
Klein

(10) Patent No.: US 12,643,171 B2
(45) Date of Patent: Jun. 2, 2026

(54) ARC WELDING TORCH DEVICE HAVING AN ANTI-KINK MEANS FOR A WELDING WIRE

(71) Applicants: SKS WELDING SYSTEMS GMBH, Kaiserslautern (DE); SKS WELDING SYSTEMS INC., Rochester Hills, MI (US)

(72) Inventor: Thomas Klein, Rodenbach (DE)

(73) Assignees: SKS WELDING SYSTEMS GMBH, Kaiserslautem (DE); SKS WELDING SYSTEMS INC., Rochester Hills, MI (US)

( * ) Notice: Subject to any disclaimer, the term of this patent is extended or adjusted under 35 U.S.C. 154(b) by 407 days.

(21) Appl. No.: 17/766,232

(22) PCT Filed: Dec. 2, 2020

(86) PCT No.: PCT/IB2020/000991
§ 371 (c)(1),
(2) Date: Apr. 2, 2022

(87) PCT Pub. No.: WO2021/064469
PCT Pub. Date: Apr. 8, 2021

(65) Prior Publication Data
US 2024/0051055 A1 Feb. 15, 2024

(30) Foreign Application Priority Data
Oct. 3, 2019 (EP) .................................... 19000446

(51) Int. Cl.
*B23K 9/12* (2006.01)
*B23K 9/26* (2006.01)

(52) U.S. Cl.
CPC ................ *B23K 9/122* (2013.01); *B23K 9/26* (2013.01)

(58) Field of Classification Search
CPC .......... B23K 9/122; B23K 9/26; B23K 9/287; B23K 9/32; B23K 9/121; B23K 9/12
See application file for complete search history.

(56) References Cited

U.S. PATENT DOCUMENTS

| 5,734,148 | A | 3/1998 | Latvis et al. |
| 8,373,094 | B2 | 2/2013 | Wells et al. |

(Continued)

FOREIGN PATENT DOCUMENTS

| DE | 1747118 | U | 6/1957 |
| DE | 1540862 | B1 | 12/1971 |
| WO | 2005049259 | A1 | 6/2005 |

OTHER PUBLICATIONS

International Search Report and Written Opinion for corresponding PCT Application No. PCT/IB2020/000991 dated May 3, 2021.

(Continued)

*Primary Examiner* — Brian W Jennison
(74) *Attorney, Agent, or Firm* — Tarolli, Sundheim, Covell & Tummino LLP

(57) ABSTRACT

For an arc welding torch device with a consumable electrode designed as a welding wire, wherein the electrode is provided with a direction of movement from a rear end of the arc welding torch device to a feeder in the direction of a front end of the arc welding torch device, in the region of which the electrode melts during an arc welding process, wherein the electrode in the arc welding torch device is guided in an exchangeable wire core, wherein the wire core is itself arranged at least in the region of the rear end of the arc welding torch in a guide element which surrounds the wire core and which is designed as an exchangeable wear part, wherein the guide element of the wire core is provided for to be exchanged together with the wire core as the result of wear, to achieve a movement of the welding wire in the region the process end, with as little resistance as possible, (Continued)

and with the least possible risk that the welding wire buckles due to the feed movement, a single-piece design is proposed for the guide element, together with a component of the arc welding torch device which has an inlet opening for the entry of the welding wire into the arc welding torch device, and which is provided for guiding a consumable welding wire provided as an electrode from the inlet opening to at least the rear end of the wire core.

15 Claims, 11 Drawing Sheets

(56)                    References Cited

U.S. PATENT DOCUMENTS

| | | | |
|---|---|---|---|
| 2005/0173379 A1 | 8/2005 | Ireland et al. | |
| 2005/0258155 A1 | 11/2005 | Deyoung | |
| 2006/0063396 A1 | 3/2006 | Bankstahl | |
| 2007/0000894 A1* | 1/2007 | Klein | B25J 19/0029 |
| | | | 219/137.9 |
| 2008/0217314 A1* | 9/2008 | Wells | B23K 9/32 |
| | | | 219/145.1 |
| 2008/0283505 A1 | 11/2008 | Christopher et al. | |
| 2013/0240496 A1 | 9/2013 | Kinder et al. | |
| 2017/0165780 A1* | 6/2017 | Centner | B23K 9/295 |
| 2019/0143439 A1* | 5/2019 | Garvey | B23K 9/133 |
| | | | 219/137.7 |
| 2020/0395711 A1* | 12/2020 | Klein | H01R 24/005 |

OTHER PUBLICATIONS

Examination report for MX application No. MX/2025/38505, dated May 6, 2025, 14 pages.
Office Action for CN application No. 201880066061.4, dated Jul. 14, 2021, 8 pages.
Office Action for CN application No. 201880066061.4, dated Feb. 4, 2024, 7 pages.
EESR for EP application No. 19000446.5, dated Apr. 20, 2023, 6 pages.
Office Action for EP application No. 1900446.5, dated Sep. 20, 2023, 6 pages.
DEPATISnet; Expert Search Results; 5 pages, Jan. 13, 2022.

* cited by examiner

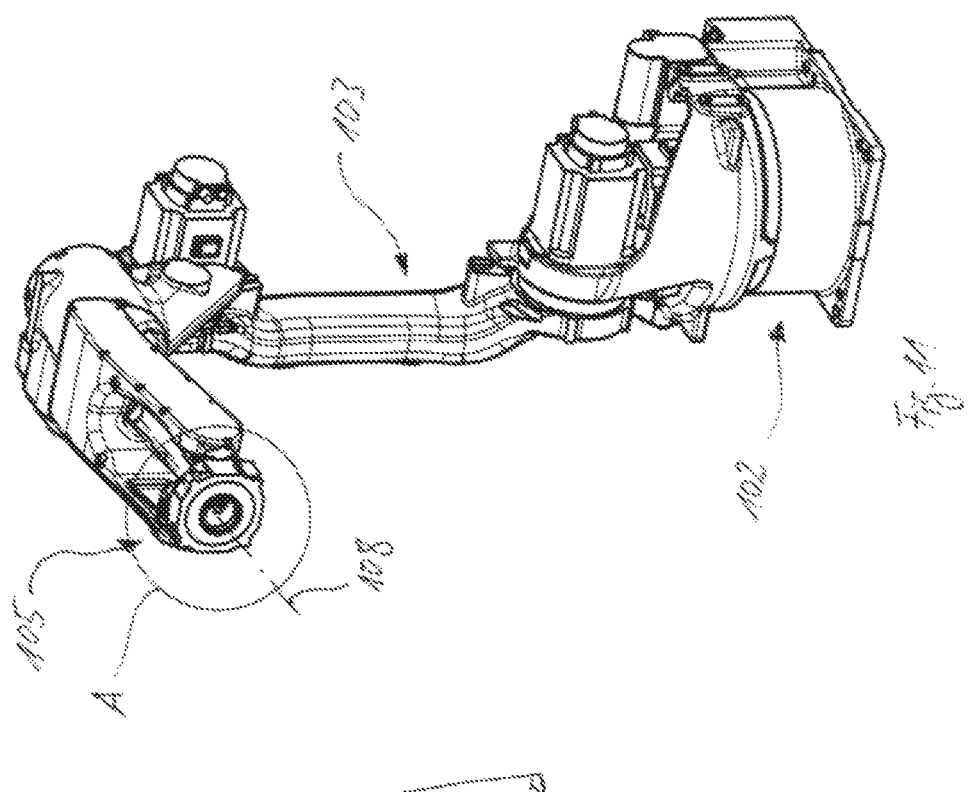
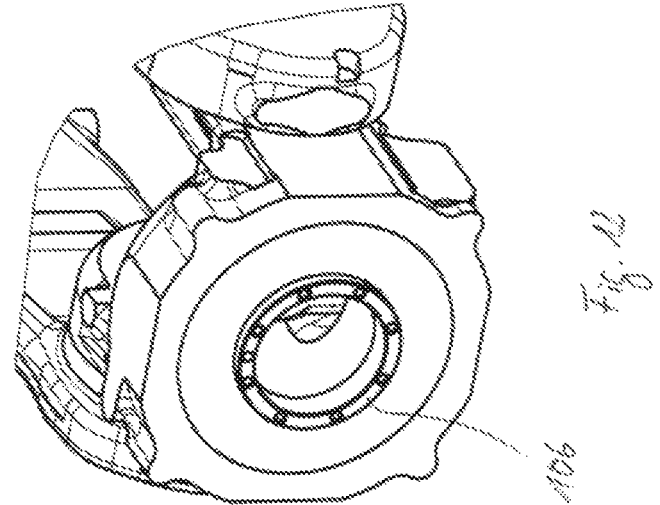

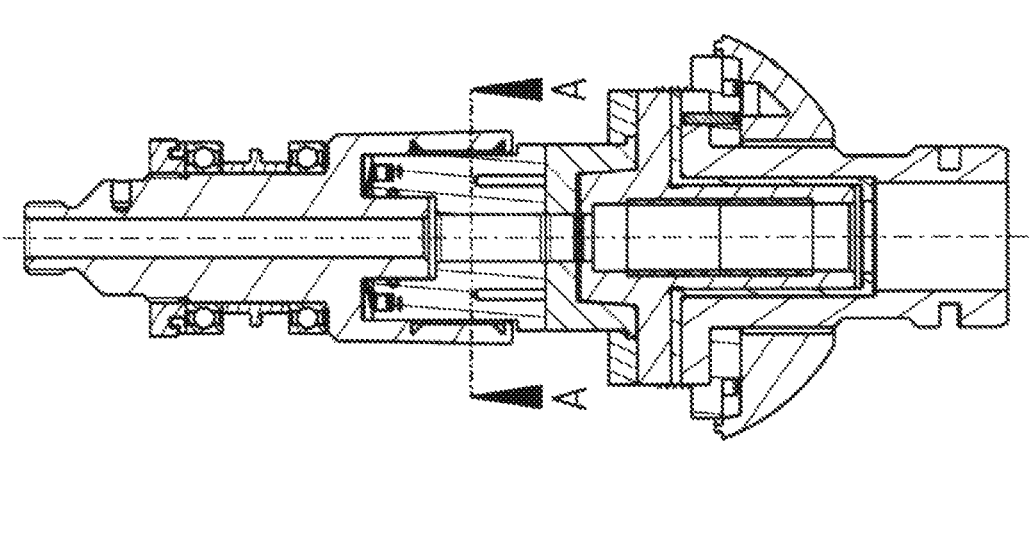
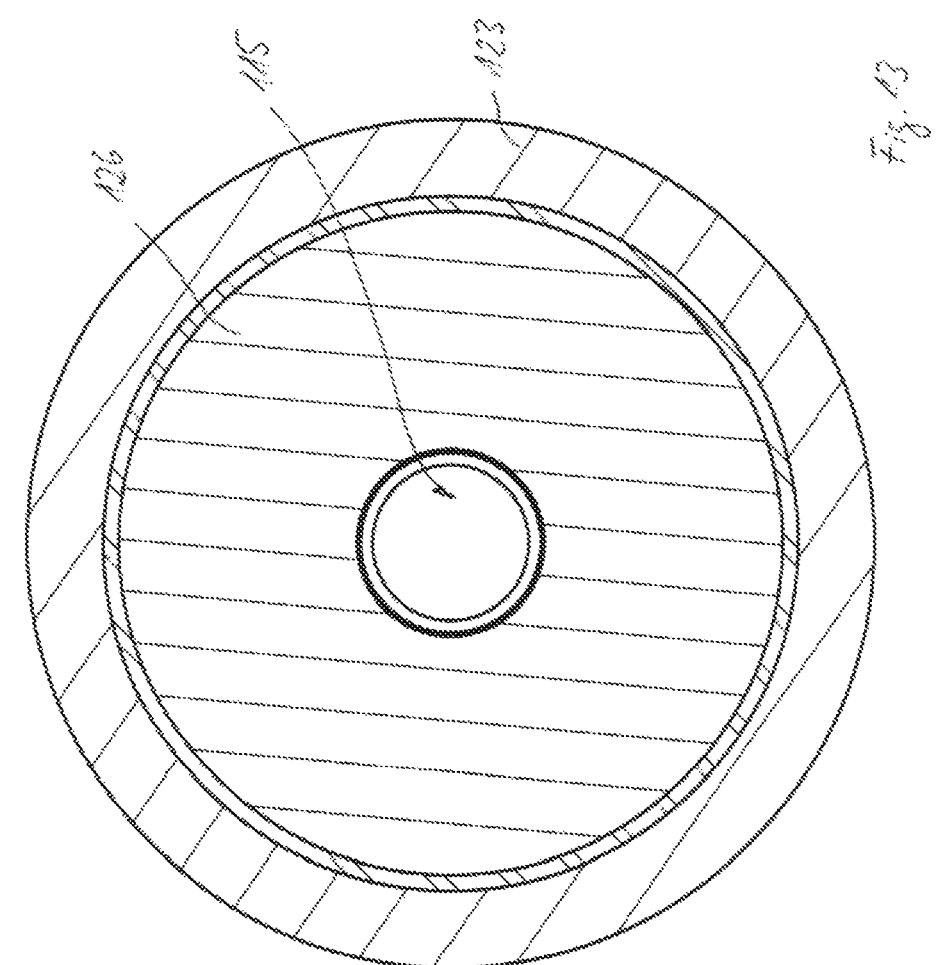
Fig. 13

ARC WELDING TORCH DEVICE HAVING AN ANTI-KINK MEANS FOR A WELDING WIRE

RELATED APPLICATIONS

The present invention is a U.S. National Stage under 35 USC 371 patent application, claiming priority to Serial No. PCT/IB2020/000991, filed on Dec. 2, 2020; which claims priority from European Patent Application No. 19000446.5 filed on Oct. 3, 2019; the entireties of both are hereby incorporated herein by reference.

The invention relates to an arc welding torch device, having a consumable electrode, wherein the electrode is provided with a direction of movement from a rear end of the arc welding torch device to a feeder in the direction of a front end of the arc welding torch device, in the region of which the electrode is consumed during an arc welding process, the electrode in the arc welding torch device is guided in an exchangeable wire core, wherein the wire core is arranged at least in the region of the rear end of the arc welding torch device in a guide element surrounding the wire core and designed as an exchangeable wear part, wherein the guide element of the wire core is provided for the exchange of the wire core due to wear.

Numerous different welding processes exist. The present invention has particular relevance to arc welding. Arc welding is based on the heat generated by an electric arc between a welding electrode and a workpiece on which welding is carried out. Due to the generation of heat, the material or materials to be welded can be melted locally. In almost all arc welding processes, a shielding gas is supplied to the region of the arc, in order, on the one hand, to enable a resistance-reducing ionized atmosphere between the welding electrode and the workpiece and, on the other hand, to prevent oxidation of the welding electrode and the workpiece. Rather than an inert gas used in this case as a shielding gas, an active gas or a mixed form which is used for the reaction can be supplied instead. Likewise, electrodes can be provided that do not require an external gas supply, since the substances required for this are integrated in the electrodes and are released when the electrodes melt.

An arc welding torch is usually designed so that a user or a robot can point a metal welding wire, which can also be referred to as a metal filler material, at a specified joint on the target metal piece. The welding wire is guided through the welding torch and finally transported to the target metal piece through an opening in the contact tip at the end of the welding torch facing the workpiece.

When an electrical voltage is applied to the welding torch internal tube and when the welding wire comes into contact with the target metal piece, a high electrical current flows from a welding torch internal tube via a so-called tip adapter, then over the contact tip, over the welding wire, and possibly an arc to the target metal piece, and then to the ground. The high current and the arc cause the welding wire to melt in a shielding gas atmosphere, which leads to the formation of droplets in the wire and the creation of an arc.

This arc melts the metal of the target metal pieces and the welding wire which is led thereto. These are connected to each other by the drops of the welding wire falling off or by the drop being transferred in a short circuit to the liquefied point of the target metal pieces. Due to the small distance from the contact tip and the gas nozzle to the arc and/or the heated target metal piece, these components are heated to a great degree. Due to the high thermal load, the contact tip in particular is subjected to heavy wear.

Most commonly, the front end portion of conventional torch systems, on the welding process end, is substantially composed of the contact tip, the tip adapter and the outer gas nozzle. These components are usually detachably mounted on the neck (external tube, internal tube) and thermally or electrically coupled to each other or to other components of the neck via contact surfaces or threads, and/or insulated. However, the external tube must be electrically decoupled from other live components, since for safety reasons it can receive no voltage. The thermal coupling of the components is an attempt to dissipate the energy that is introduced into the contact tip or gas nozzle in the form of heat via the external tube or internal tube as effectively as possible, and to thereby lower the maximum temperature of the contact tip in order to minimize wear.

In the case of arc welding torch devices of the generic type, the welding wire of the arc welding torch, which functions as a consumable electrode, and the shielding gas—in cases where the given welding process involves such a gas—are supplied in the region of the device rear end. The welding wire is fed through the interior of the arc welding torch from its rear end to the outlet at the front end where the process is performed, at a pace corresponding to the consumption. For this purpose, a wire feed which is known per se is arranged in the region of the rear end, and feeds the welding wire—for example, by means of a driven pair of wheels—and moves it through the interior of the arc welding torch device. In order to protect the interior of the arc welding torch device itself from wear due to the feed movement of the welding wire, the welding wire is usually arranged in a so-called wire core. The wear due to the feed movement of the welding wire therefore takes place primarily in the wire core and not on components of the housing of the arc welding torch device. The latter thus wears out instead of the interior of the arc welding torch device itself. As a result, it is necessary for the wire core to be replaced from time to time due to wear.

Conventionally, for the exchange of the wire core due to wear, it is necessary for the welding torch device to be disassembled—in particular, and most of all, the rear end of the arc welding torch device opposite the end where the welding process takes place—which is located opposite the wire feed means. This is associated with great expenditure of time for the disassembly and assembly of the arc welding torch device. A solution is therefore already known from EP 1 658 155 B1, in which the wire core is exchanged from the welding process end of the arc welding torch device. To dismantle and remove the wire core, only the front end of the arc welding torch device has to be disassembled, wherein a connection of a guide means for the wire core with other components of the arc welding torch must be released and the guide means must be removed together with the wire core. Then a new wire core, together with the guide means, is reinserted from the front into the arc welding torch device and is pushed through to the rear end of the welding torch, and the guide means is detachably fastened again within the arc welding torch device.

Regardless of whether the wire core is exchanged from the front or the rear end of the arc welding torch device, the problem arises with both solutions that, when the arc welding torch device is in operation, the welding wire, which is between the wire feed means, which are usually designed as a rotating pair of rollers, and the rear end directly opposite the wire feed means, can tend to buckle. The welding wire pushed through the wire feed means runs into the arc welding torch device through a narrow bore in an end cap. If resistance occurs here, for example due to friction of the welding wire in the bore, the wire can deflect and kink outside the end cap. To counteract this, the end face of the end cap is usually conical in design, such that the end cap can be pushed a short distance into the funnel-shaped area between the two drive rollers. The region between the contact point of the drive rollers with the welding wire and the entry point of the welding wire of the end cap, in which the welding wire is not yet in the arc welding torch or in the wire core protecting it, somewhat reduces the problem of kinking, but only slightly. Nevertheless, the risk of kinking is still practically relevant—especially, but not only, with very thin, soft wires.

The invention is therefore based on the object of proposing a measure by which a movement of the welding wire with as little resistance as possible can be achieved in the region of the process end with the least possible risk of the welding wire buckling due to the feed movement.

According to the invention, this object is achieved in an arc welding torch device of the type mentioned at the outset by a single-piece construction of a component of the arc welding torch device, which component has an inlet opening of a through-recess for the entry of the welding wire into the arc welding torch, and which is provided for guiding the welding wire in the arc welding torch inside the through-recess of the inlet opening until at least the rear end of the wire core, wherein this single component is also provided as an anti-kink means for the welding wire, which protrudes from the arc welding torch device and is arranged between an outer end cap of the housing of the arc welding torch device and the wire feed means, in which the welding wire is guided in the through-recess.

The invention is thus based on the idea of guiding the welding wire from its entry into the arc welding torch device to the rear end of the wire core in just a single component, and transferring it to the wire core in this component. This further component should preferably extend in the direction of the wire feed means, starting at least from the end cap. However, the end face of this single-piece component, on the welding process end, is preferably arranged in the region of the longitudinal axis of the welding wire at a distance from the inner side of the end cap, wherein this distance may be provided for forming the receptacle for the wire core in this component. In addition, this component, which is provided as an additional component to the end cap and is preferably also designed as an anti-kink means, should have the smallest possible external radial extent in the region of its end on the wire feed end in relation to the longitudinal axis of the welding wire—in particular, a significantly smaller external radial extent in a plane which is oriented perpendicular to the axes of rotation of the preferably two rollers of the wire feed means. The anti-kink means can be passed through the end cap and placed as close as possible to the point where the wire feed means, which is usually designed as two opposing rollers, contacts and acts on the welding wire. As a result, the distance which the welding wire is pushed while running freely and unguided can be kept as short as possible. The anti-kink means integrated into the component can in particular protrude beyond the end cap in the axial direction towards the wire feed means. This results in a longer distance over which the pushed welding wire is guided, which significantly reduces the tendency of the welding wire to buckle in its unguided section as a result of the feed movement. This also significantly improves the unimpeded entry of the wire during automated threading.

An improvement in the unimpeded entry of the welding wire into the anti-kink means and an improvement in the functional reliability when threading the welding wire into the anti-kink means can also be achieved by a bevel on the boundary wall of the through-recess for the welding wire in the single-piece component in the region of the inlet opening of the through-recess. Such a bevel also means that the welding wire has less of a tendency to get caught in the boundary wall of the through-recess, as a result of which the risk of the welding wire kinking can be further reduced.

In connection with the present invention, it can be particularly expedient if the anti-kink means is exchangeable, such that it is possible to respond to the wear caused by the movement of the welding wire in the anti-kink means. This ability to be exchanged can also be achieved in a preferred embodiment of the invention through the single-piece construction with the component receiving the wire core. Since this component receiving the wire core in the interior of the arc welding torch—preferably together with the wire core, so they can be exchanged together—can be pulled out of the arc welding torch toward its welding process end and out of the same, this component, which also contains the anti-kink agent, can easily be exchanged for a new, unworn anti-kink means. This new component is then reinserted into the arc welding torch device from the welding process end together with a new wire core and with the likewise-new anti-kink means integrally formed thereon, and is pushed through the arc welding torch device up to the wire feed end thereof. At the wire feed end of the arc welding torch device, this insertion movement is preferably halted by the fact that the component hits a stop. The anti-kink means should also have reached its end position in the arc welding torch device in this case, where it is passed through the end cap and a portion thereof preferably protrudes from the end cap in the direction of the wire feed means.

In a preferred embodiment of the invention, it can be provided that the anti-kink means is detachably arranged inside the arc welding torch device, and a portion of the anti-kink means protrudes from a recess in the end cap of the arc welding torch device in the direction of the wire feed means. In this way, a particularly simple arrangement, positioning, and optionally also a simple exchange of the anti-kink means can be achieved. The recess of the end cap and/or the interior of the arc welding torch can be provided for the purpose of achieving a positionally accurate and positionally secure arrangement of the anti-kink means, in particular by means of a positive fit between the anti-kink means and, in particular, the housing of the arc welding torch.

In connection with the present invention, it is further preferred that the anti-kink means is an integral part of a component in which the wire core is arranged in the region of the end cap in the interior of the arc welding torch. In this way, a very precise coordination of the guidance of the welding wire in the anti-kink means and in the interior of the arc welding torch can be achieved particularly easily. There is also an advantage for the automated threading of the wire, in which the single-piece construction prevents the wire from getting caught in the arc welding torch device. Above all, however, this solution offers, due to the advantageous single-piece construction, the possibility of a transition-free and stepless design of the at least one guide surface for the welding wire, which extends from the anti-kink means to the beginning or rear end of the wire core inside the arc welding torch. Avoiding transitions in this at least one guide surface, namely the boundary surface of the through-recess of the anti-kink means, also contributes, in addition to the improved anti-kink means, to keeping the resistance as low as possible when the welding wire is fed through, and thus to preventing the welding wire from kinking due to the feed movement. Finally, the single-piece construction also leads to a low number of required components that have to be assembled, disassembled and stored as exchange parts.

In a particularly advantageous embodiment of the invention, in which the anti-kink means can be installed particularly quickly and also exchanged, for example when worn or damaged, it can be provided that the anti-kink means is arranged on the arc welding torch without any connection. A connectionless arrangement allows for the advantage that assembly and exchange can also be carried out without tools, for example. In order to achieve a positionally accurate and secure arrangement of the anti-kink means on the arc welding torch device despite the preferred connectionless arrangement of the anti-kink means on the arc welding torch device, it can be provided that the anti-kink means is arranged in the arc welding torch in a predetermined position, in particular an axial position, due to a positive arrangement of the anti-kink means in the axial direction in the arc welding torch.

In a further particularly advantageous embodiment of the invention it can be provided that the anti-kink means is formed in one piece with a receptacle for a wire core arranged inside the arc welding torch, wherein the through-recess of the anti-kink means for the welding wire opens into said receptacle. This preferred design of the anti-kink means can be achieved, for example, in that a conical second portion of the outer shell surface is joined to a cylindrical first portion of the shell surface of the anti-kink means with a smaller outer diameter, which conical second portion then transitions with a greater diameter into a cylindrical third portion which has a preferably, at least approximately, constant diameter. A central recess which is open at the end can be arranged within this third section, the inner diameter of which is large enough to receive an end region of the wire core and the welding wire guided therein. The welding wire preferably passes through an opening in the anti-kink means in this single-piece component, which leads to a recess with a constant diameter which substantially corresponds to the diameter of the given welding wire and in which the welding wire is guided until it reaches the wire core. This recess can advantageously also be provided with an internal thread into which a wire core, wound like a helical spring, can be screwed by its outer surface. At the wire feed end, the anti-kink means has a conical inlet/bevel, starting from the end face, which results in considerable advantages when the welding wire is automatically threaded in by the feed means.

The present invention can be particularly advantageous in connection with automated welding processes in which an arc welding torch device is guided and moved by a welding robot. The problem in such a case is that, in order to exchange a worn wire core, it is possible that not only does the arc welding torch device itself need to be completely or partially disassembled, but it may also be necessary to remove the arc welding torch of the torch device from the robot so that there is access to the wire core, and so that an exchange of the wire core is made possible. The more extensive the disassembly which must take place, the more extensive and time-consuming the subsequent assembly will be. Due to the disassembly, there may even be another time-consuming teach-in of the welding robot with the arc welding torch attached. The exchange of wire cores from the welding process end according to the invention, together with the position signaling means according to the invention, can therefore have particular advantages for preventing extensive disassembly and subsequent re-assembly of the automatic welding system. Accordingly, the wire core can be exchanged quickly and without extensive disassembly work, wherein the new wire core can nevertheless be arranged in the correct position inside the arc welding torch device.

In connection with the present invention, this advantage can be particularly pronounced when a hollow shaft robot, such as a "Motoman" type robot, produced as a welding robot by the manufacturer Yaskawa Europe GmbH, 65760 Eschborn, Germany, is used as the robot. In such hollow shaft robots, the welding media, such as the welding wire, shielding gas, and electric current, are guided substantially or at least approximately concentrically with the axis of rotation of the hollow shaft through the mount used for attaching the arc welding torch to the robot, said mount being designed as a rotationally driven hollow shaft. Disassembling the arc welding torch itself and the robot mount is particularly labor-intensive in this case. Such a hollow shaft robot and a particularly advantageous solution for an arc welding torch that interacts with this hollow shaft robot are described, for example, in EP 1 689 550 B1. The content of that disclosure is hereby fully incorporated by reference.

A preferred arc welding torch of an arc welding torch device, which is provided for arrangement on a welding robot with a robot arm, can therefore have a connection device which can be rotated relative to the robot arm and which has a fastening device for attaching the welding torch device to the welding robot, can therefore have a receiving device for mounting a welding torch and for the transmission of driven rotary movements to the welding torch, an electrical connection for a welding power cable by means of which a robot side of the welding torch device can be electrically connected to a welding power source, and a power transmission device via which the welding current cable can be electrically connected to a welding torch side of the welding torch device. The power transmission device can have a stator which is provided for a non-rotatable arrangement with respect to the robot arm, but which is rotatable with respect to the connection device on the welding robot side. Furthermore, there can be a bushing of the stator through which at least one of the consumables required for the welding process can be routed in the direction of the receiving device, wherein the receiving device and the fastening device are designed as a rotor, and are accordingly rotatable relative to the stator. The receiving device and/or the fastening device can be connected to the stator in an electrically conductive manner by means of an electrical contact device, wherein the fastening device of the rotor is designed for attachment to the connection device of the robot. Due to the attachment to the connection device of the robot, an axis of rotation of the rotor is at least substantially in alignment with the axis of rotation of the connection device of the robot, and the rotor is rotatable about the axis of rotation and about the stator.

It can furthermore be preferred that, in an arc welding torch device according to the invention, a recess is provided which runs along the axis of rotation of the rotor and runs centrally (in alignment) with respect to the axis of rotation through both the fastening device and the receiving device, wherein both an inlet opening of the recess in the stator and an outlet opening of the recess in the rotor are also arranged centrally and thus in alignment with respect to the axis of rotation. In this particularly preferred solution for hollow shaft robots, the inlet opening in the arc welding torch for welding media coming from the welding cable is thus located along the axis of rotation of the arc welding torch. The outlet opening for the exit of welding media from the rotor and its transfer into the welding torch neck is also in alignment with the axis of rotation of the rotor. The entire recess thus preferably runs along the axis of rotation of the rotor and thus also of the robot-side connection device with which rotational movements of the rotor around the stator are generated and transferred from the robot to the rotor.

In such a preferred embodiment of the invention, the welding wire can thus be inserted into the arc welding torch device at the wire feed end and passed through the wire core to the end of the arc welding torch on the process end. While the arc welding torch device is in use, the welding wire is continuously fed because of the welding wire tip melting off in the region where the process takes place. The welding wire is accordingly moved longitudinally through the entire arc welding torch device, and thus also through the connecting flange of the hollow shaft robot for the arc welding torch and through its stator. To replace the wire core and its assembly, the arc welding torch must preferably only be slightly disassembled in the region of its end where the process is carried out, so as to allow access to the process end of the wire core. This can then be completely pulled out of the arc welding torch and its process end by hand. The arc welding torch device remains unmodified on the connection flange of the hollow shaft robot, and the worn and the new wire core and the associated assemblies, preferably including the position signaling means and/or preferably the anti-kink means, are moved inside the arc welding torch and thus through the connection flange. The exchange of the wire core can thus be carried out extremely quickly and reliably with little effort, even with a hollow shaft robot.

In connection with a single-piece design of a component which comprises the guide element for receiving one end of the wire core, and which comprises a section in which the welding wire enters the arc welding torch device on the wire feed end, particular advantages can result when using an arc welding torch device on a hollow shaft robot. Both the wire core and the component of the arc welding torch device in which the welding wire coming from the wire feed device first enters the arc welding torch device are wear parts, due to the relative movement of the welding wire in these components, and must therefore be replaced from time to time. Since, in the solution according to the invention, the wire core and the guide element receiving one end of the wire core have to be exchanged due to wear, it is of great advantage if the guide element and the component provided with the inlet opening for the welding wire and a through-recess for the latter are formed in one piece, and are thus pulled out of the arc welding torch device together for exchange at the process end. This configuration prevents the need, as in the case of a multi-part design of the components in question, for disassembling the arc welding torch device at the wire feed end in order—due to wear—to exchange the component which receives the welding wire when it enters the arc welding torch device. This component can preferably be an anti-kink means which is advantageously formed in one piece with the receptacle for the end of the wire core.

Further preferred embodiments of the invention emerge from the claims, the description and the drawing.

The invention is explained in more detail with reference to embodiments shown purely schematically in the figures, wherein:

FIG. 11 is an embodiment of a suitable articulated arm robot;

FIG. 12 is an enlarged detailed illustration according to line A of FIG. 11;

FIG. 13 is a cross-sectional view of the sliding contact device of FIG. 10.

Figure 1:
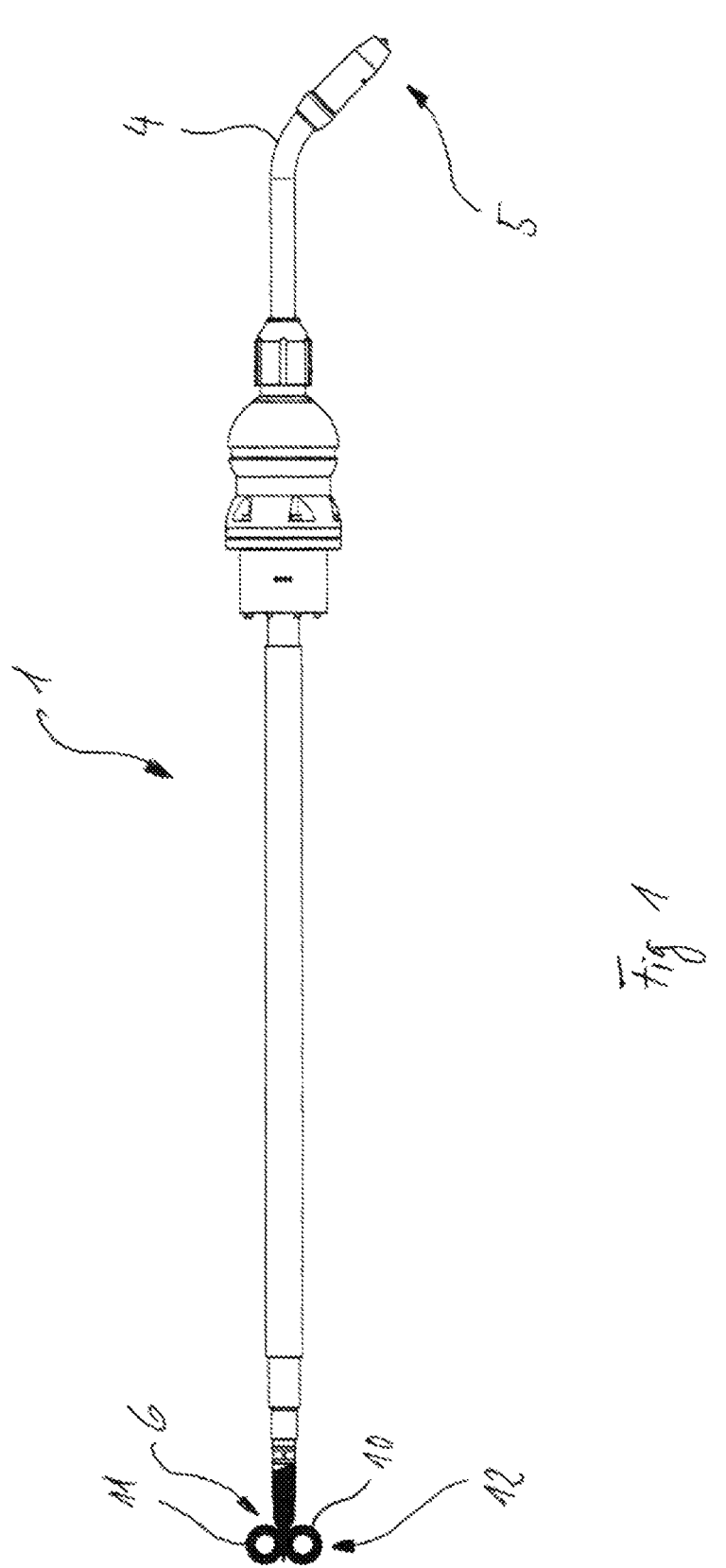
FIG. 1 is a preferred embodiment of an arc welding torch device according to the invention, together with a wire feed device.

FIG. 1 shows a preferred embodiment of an arc welding torch device 1 according to the invention. The arc welding torch device 1 is intended for use in an automatic welding machine, such as a welding robot, which is not shown in detail. The arc welding torch device 1 is arranged on an end manipulator of the robot, not shown in detail, which can be moved in different spatial directions, preferably in all spatial directions on any desired feeding paths. The end manipulator can thereby carry the arc welding torch 1 along its feeding path, and the arc welding torch 1 can create welded seams on workpieces. The arc welding torch can in principle be designed in the same way as the arc welding torch disclosed and described in WO 2005/049259 A1, wherein differences with regard to the end region of the arc welding torch are seen in FIG. 1, and will be discussed below. Due to the not absolutely necessary, but particularly preferred, embodiment of the arc welding torch 1, according to which it has an external stator part and an internal rotor part and the welding point is fed and supplied with welding media at least substantially along and coaxially with a longitudinal axis 3 of rotation of the arc welding torch device and the end manipulator, the welding torch can be continuously rotated, and twisting of a welding cable during rotational movements can be avoided. It is explicitly pointed out that the arc welding torch shown and discussed here is only given as an example of the invention and the invention can in principle also be used in connection with other types of arc welding torches—and in particular with arc welding torch devices having a specific structure which differs from the structure of the arc welding torch device discussed below.

The arc welding torch device 1 shown merely as an example for the invention is a welding torch 1 operating according to the gas-shielded metal arc welding method. In this case, a welding wire 7 which melts off during the welding process is fed to the intended welding point, and is continuously advanced during a welding process as a result of the consumption of the welding wire 7. The welding wire 7 in this case is most commonly led through the interior of the welding torch 1, primarily through a jacket tube 2, together with its wire core 8a and preferably an insulation surrounding the welding wire. In addition, a shielding gas is supplied to the welding point, most commonly also through the jacket tube 2. In this embodiment, the shielding gas is an inert gas; in other embodiments according to the invention, an active gas—or a mixed form of both—can also be supplied as the shielding gas. In the preferred embodiment, current is also supplied into the arc welding torch device 1 in the region of the rear end 6 of the arc welding torch device and passed through the arc welding torch device to the welding or process point, and is used at the welding point or in the region of the welding process end 5 of the arc welding torch device to ignite an arc and maintain it for the welding process. The arc welding torch device 1 when used is therefore connected to or provided with a welding power source (not shown) and a wire feed means 12. In preferred embodiments, the welding wire, the shielding gas, and the current can be fed to the arc welding torch at its power connection point via a welding cable known per se, in particular a coaxial welding cable. At a gas connection point of the arc welding torch device 1, the shielding gas is introduced into a duct 9 of the welding torch 1 in its interior, to guide the shielding gas through the same from the connection point to the free end at the welding point. The current is likewise conducted from the welding cable through the welding torch 1 to the welding or process point. The current is also conducted inside the welding torch to the process point in such a way that an outer side of the arc welding torch device 1 is current-free.

The arc welding torch device 1 accordingly has a torch neck 4 which is connected to a cable-hose assembly 2. The cable-hose assembly 2 runs approximately from the rear end 6 of the arc welding torch device 1 to the welding torch at the front end 5 on the welding process end. In the region of the rear end 6, which is shown in FIG. 2, several exchangeable wear parts are arranged in the interior of the arc welding torch 1; these will be discussed in more detail below.

Figure 2:
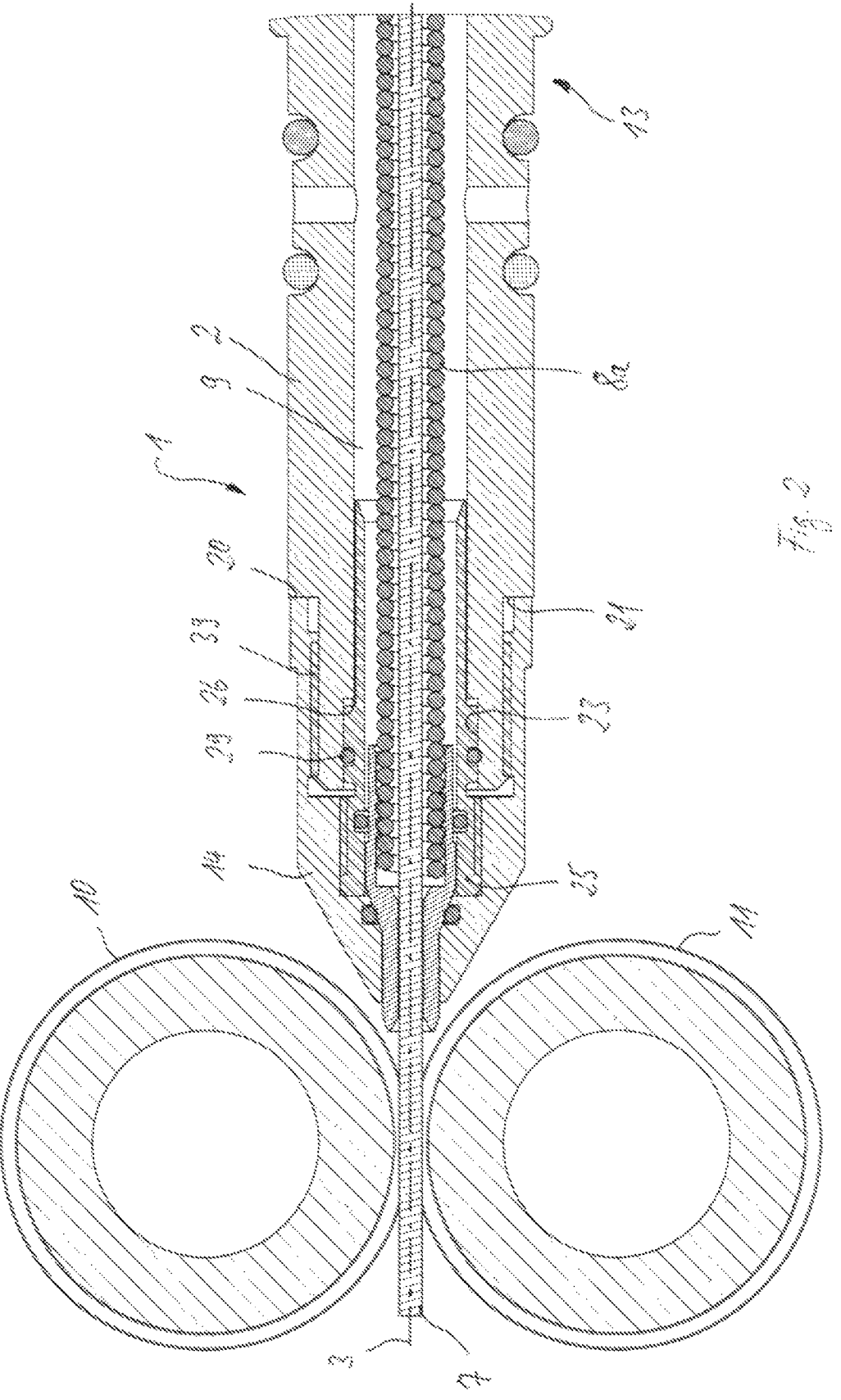
FIG. 2 is a sectional illustration of a rear end region of the arc welding torch device of FIG. 1.

In FIG. 2, the rear end 6 of the arc welding torch device 1 which is remote from the welding process point and the associated open front end 5 of the arc welding torch device 1 is shown in a detailed view, together with two drive rollers 10, 11 of a wire feed device 12. In this illustration, the welding wire 7 is shown between the two drive rollers 10, 11 with their peripheral surfaces opposite each other. The drive rollers 10, 11 are located directly opposite the rear end 6 of the arc welding torch device 1 which is remote from the process point of the arc welding torch 1. This front end 6 of the approximately tubular jacket tube terminates with an end cap 14 which has a through-bore 16 (FIG. 3) along the central axis 3 of the housing 14, which is open towards the front outer end of the end cap 14. The end cap 14 is open towards the process end of the arc welding torch device, and from there is provided, in the direction of the open through-bore 16, with a stepped central recess 17. The latter initially has a constant, greater diameter 18, which merges into a constant diameter 19 of the recess which is smaller in comparison. This region in turn transitions into the through-bore 16. The inner peripheral surface of the smaller diameter portion 19 is provided with an internal thread 19a. Likewise, the inner circumferential surface of the region of the greater diameter 18 also has an internal thread 18a. The latter extends until shortly before the transition to the smaller diameter 19.

The outer/shell surface of the end cap 14 has a section 14a which widens conically from the end in the direction of the process point, and which merges into a section 14b of the shell surface with a constant diameter. With its end face 20 facing the process point, the end cap 14 abuts an outer shoulder 21 of the jacket tube 2 of the arc welding torch 1. The jacket tube 2 protrudes into the area of the greater inner diameter 18 of the end cap 14 until shortly before the transition to the smaller diameter 19. An inner diameter 23 of a through-recess of the jacket tube 2 in the region of its front end corresponds to the smaller diameter 19 of the recess 17 of the end cap 14, such that a sleeve-shaped inlet body 25 can be received by its outer shell surface in the jacket tube 2, at least substantially with a positive fit. To secure the position of the sleeve-shaped inlet body 25 in the axial direction, the through-recess 24 of the jacket tube 2 has a shoulder 26 with a smaller inner diameter, the shoulder being provided as a stop for the inlet body 25.

In the region of the jacket tube 2, a cut-in 28 or a radially circumferential groove is formed on the outer shell surface or on the outer shell surface of the sleeve-shaped inlet body 25, which is intended to receive a sealing element 29 or sealing means, such as an O-ring in particular. A section of the outer surface of the inlet body 25 which is located opposite the smaller diameter 19 of the recess of the end cap 14, is provided with an external thread 30 which can be screwed into the internal thread 19a of the cylindrical circumferential surface of the section of the recess 17 of the end cap 14 with the smaller diameter 19.

The sleeve-shaped inlet body 25 is formed with a through-recess 25a which is provided with a continuously constant inside diameter. Only in the region in which a guide element 32, preferably without a connection to the inlet body, is situated in the through-recess 25a of the inlet body 25, does the recess 25a have a cut-in 25b or groove for the arrangement of a sealing element 33 or sealing means, such as an O-ring in particular. The sealing element arranged in the groove 25b of the inlet body 25 thus has contact with the outer shell surface of the guide body 32.

The inlet body 25 has an outer shell surface with different sections which differ from each other primarily in the size of their outer diameter. In the embodiment shown, a first section of the outer shell surface close to the rear end of the arc welding torch has the external thread 30 with which the inlet body 25 is screwed into the internal thread 19a of the end cap 14, and thereby detachably connected to the end cap 14. Towards the process end 5 of the arc welding torch device 1, the external thread 30 is followed by a cut-in 35, which in turn is followed by a threadless section 36 of the outer shell surface, which has the same external diameter as the threaded section 30. The threadless section 36 has the circumferential groove 28 in which the further sealing element 29 can be received—in the case of the embodiment shown, an O-ring.

In the direction of the process end 5, a further, final section 37 of the outer shell surface of the inlet body 25 then follows, which also has a constant but smaller outer diameter than the preceding section. The shoulder 38 formed by means of the change in diameter between the last section 37 of the outer shell surface and the section 36 preceding it results in an insertion or rotation limitation for the jacket tube 2 on the inlet body.

The jacket tube 2 in turn has in the region of its front end, on its outer shell surface, an external thread 39, onto which the end cap 14 is screwed with its internal thread 18a. The screwing-in movement is limited by the end face 20 of the end cap 14 impacting the shoulder 21 of the jacket tube. Reaching this position can be a visual check that the end cap is correctly mounted and screwed.

Figure 3:
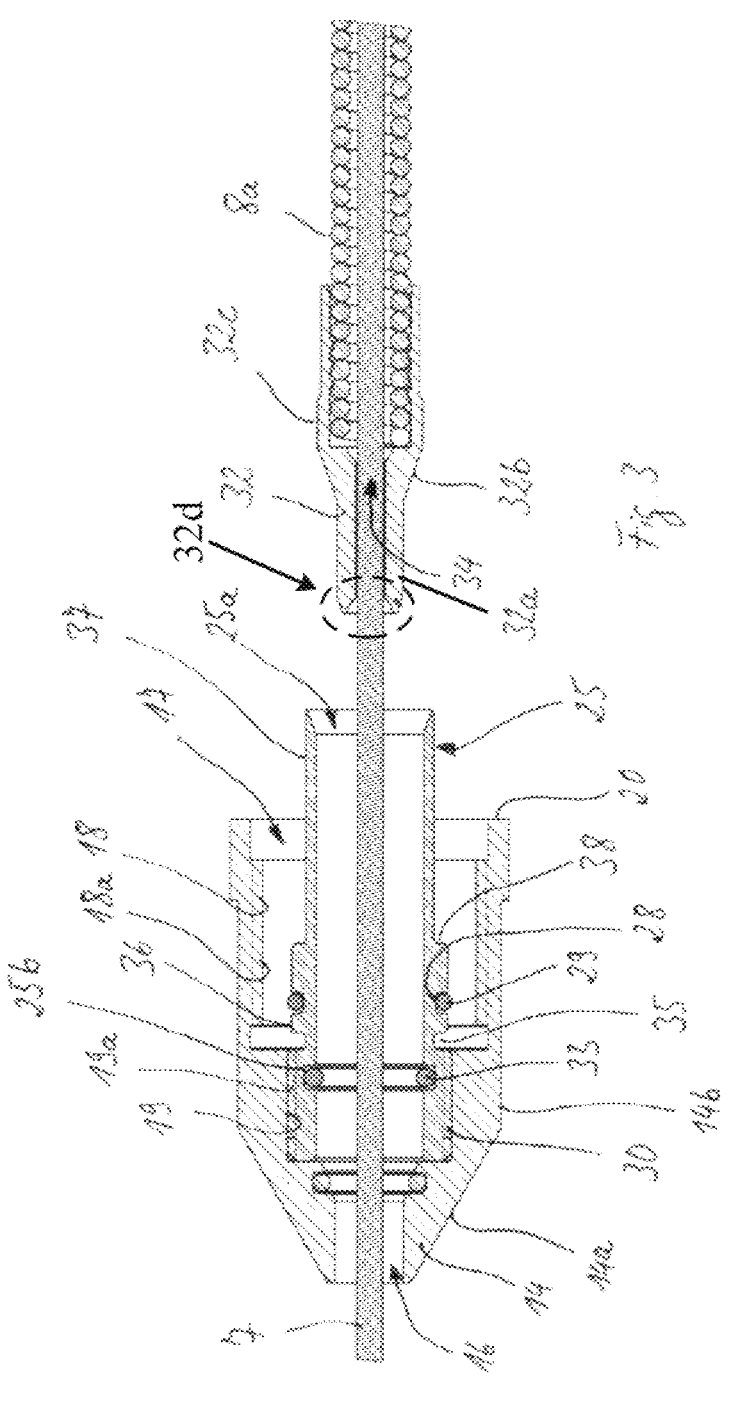
FIG. 3 is an exploded view of the detail of FIG. 2.

In FIG. 3, the wire feed end or rear end 6 of the arc welding torch device 1 is shown in an exploded view, and in a situation which occurs when the wire core 8a is changed. As can be seen here, the inlet body 25 is screwed into the end cap 14 during operation of the arc welding torch device 1. Likewise, all seals are inserted in their grooves and remain there even when the wire core is changed. In the illustration of FIG. 3, the jacket tube 2 is not shown; it is connected, unchanged, to the end cap 14 by the shared screw connection, and remains connected even during the change of the wire core 8a. In order to change the wire core 8a, the arc welding torch is first disassembled at the process end 5 so that the wire core 8a and the guide element 32 can be pulled out of the process end 5 together. In a current arc welding torch of the applicant, in which the invention described here is to be integrated in the future, the gas nozzle, a current contact tip, and optionally a tip adapter, by way of example, can be detached from the arc welding torch and removed from the welding wire. The wire core 8a can then be pulled out of the arc welding torch from the process end 5. The guide body 32 seated on the wire core 8a and connected to the latter by a press fit is pulled out of the arc welding torch device 1 together with the wire core. The guide element, which is seated in the recess of the end cap and the recess of the inlet body in this embodiment largely without connection to the two components, can thus be pulled out of the two components and out of the arc welding torch 1 together with the wire core 8a without additional effort, in particular without great effort. When this assembly is pulled out, only a comparatively low holding force acting on the shell surface of the guide element via an O-ring seal has to be overcome.

A new wire core 8a can then be arranged with one of its two ends on the welding wire 7 and inserted into and arranged in the guide body 32. The guide body 32 and the wire core 8a on the welding wire 7 can then be pushed together in a single operation into the welding torch and thus also into the arc welding torch device 1. This insertion movement in the direction of the end cap 14 is continued until the guide body 32 with its end 32a on the end cap, serving as a position indicator, is completely passed through the open through-recess 16 of the end cap 14, and the end 32a of the guide element 32 protrudes outwards out of the end cap 14. The visually recognizable end of the guide element 32, with one of its ends 32a arranged outside of the arc welding torch device 1, provides a means of checking, without additional technical outlay, whether the guide body 32 and the wire core 8a are arranged in their predetermined target positions inside the arc welding torch device 1. Since the guide body 32 is only sealed against leakage of the shielding gas flowing in the arc welding torch device in the intended positions thereof, the end 32a of the component of the guide body 32 that is visible outside the end cap 14 also provides a check to determine whether the newly inserted wire core 8a and its guide bodies 32 are arranged in such a way that the arc welding torch 1 is sealed against the escape of shielding gas from the end 6 of the arc welding torch 1 at the end cap.

The component of the guide body 32 comprises the cylindrical end region section 32a lacing the wire feed device when in the position of use on the arc welding torch 1, which in this embodiment is elongated and has a constant outer diameter. The end region section 32a merges into a section 32b which enlarges conically towards the end 5 on the process side, which is adjoined by a cylindrical section 32c with a greater, preferably constant, outer diameter. In the embodiment in FIGS. 2 and 3, the section 32c has a shoulder with a slightly reduced outer diameter. When it is inserted into the arc welding torch device 1, the guide body 32 is inserted into the inlet body 25 with its end region 32a first. Since a front, outside diameter of section 32c in the insertion direction corresponds approximately to the inside diameter of the through-recess 25a of the inlet body 25, the guide body is guided within the inlet body during its feed movement. As a result, the end region section 32a is also aligned in the correct position and arranged concentrically around the longitudinal axis 3, and can be inserted into the through-recess 16 of the end cap 14. Since the end region section 32a has a constant outer diameter which is only slightly smaller than the diameter of the through-recess 16, the end region section 32a can be completely inserted into the through-recess, and part of the end region section 32a can be pushed out of the through-recess 16 of the end cap. This part of the end region section, which can be referred to as a position indicator means, is thus recognizable from the outside in its end position in the welding torch 1, and is located comparatively close to the point of engagement of the wire feed device at which the feed movement is applied to the welding wire 7. This position indictor means can be used for a signalization which is visually perceptible from the outside, showing that the guide body and the wire core 8a are correctly positioned in the interior of the arc welding torch.

The single-piece component of the guide body 32 is provided with a through-recess 34 which, in the region of the end region section 32a, has a preferably constant diameter which is only slightly greater than the diameter of the welding wire used in this case. In the region of the section 32c with the greater outer diameter, the through-recess 34 has a greater, but also constant diameter, such that the rearward end of the wire core 8a can be arranged in this region of the through-bore. The inside diameter of the recess 34 in this area corresponds approximately to the outside diameter of the wire core. With its front end, the wire core 8a abuts the shoulder 34a resulting from the change in diameter in the through-recess 34. The single-piece construction of the guide body 32 results in good guiding properties for the welding wire in the guide body 32, with at most a low risk that the welding wire 7 will get caught during its movement and thereby buckle.

Beveling the opening of the through-recess 34 in the region of the end face of the end region 32a of the guide body can contribute to preventing the welding wire 7 from getting caught on or in the guide body 25 during the feed movement, and to facilitating the insertion of a welding wire end into the guide body 25.

Different guide elements 32 with different diameters of the through-recess 34 can also be provided for different welding wires. Such a system can in particular have guide bodies which are identical in their geometrical outer shape, but which differ in terms of the diameter of their respective through-recesses 34, and optionally also in terms of the materials used for the guide elements, such that an adaptation to the given material of the welding wire can take place in an advantageous manner.

The end region section 32a includes a beveled end portion 32d that protrudes from the end cap 14 of the component of the guide element 32 in which the welding wire 7 is guided also shortens the free and unguided length of the welding wire between the wire feed device and the arc welding torch device 1. Due to the smaller outer diameter of the end region section 32a of the component of the guide element 32 compared to the front end of the end cap 14, the end portion 32d of the guide element 32 protruding from the arc welding torch device can be arranged closer to the contact point of the welding wire with the two feed rollers of the wire feed device. The welding wire is thus received earlier by the end portion 32d of the guide element 32 and guided by it, which reduces the risk of the welding wire kinking. Thus, the end portion 32d of the end region section 32a of the guide element 32 with the smaller outer diameter that protrudes from the end cap 14 can be referred to as an anti-kink means.

The invention also has the advantage that, unlike in the past, the end cap 14 neither guides nor touches the welding wire 7 nor the wire core 8a, and thus the end cap 14, which is usually complex, is no longer a wear part.

Figure 4:
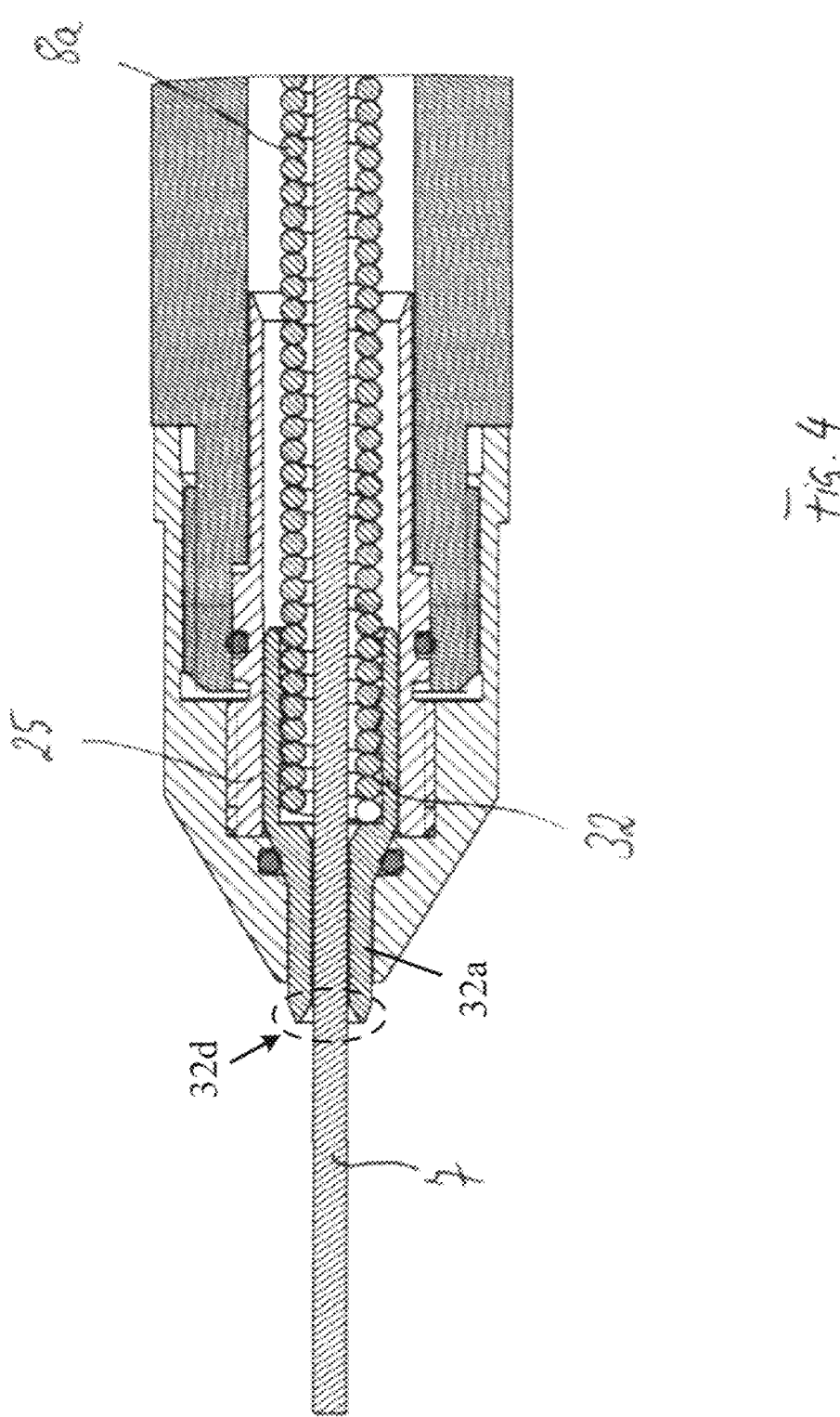
FIG. 4 is a sectional view of a rear end region of a further embodiment of an arc welding torch device according to the invention.
Figure 5:
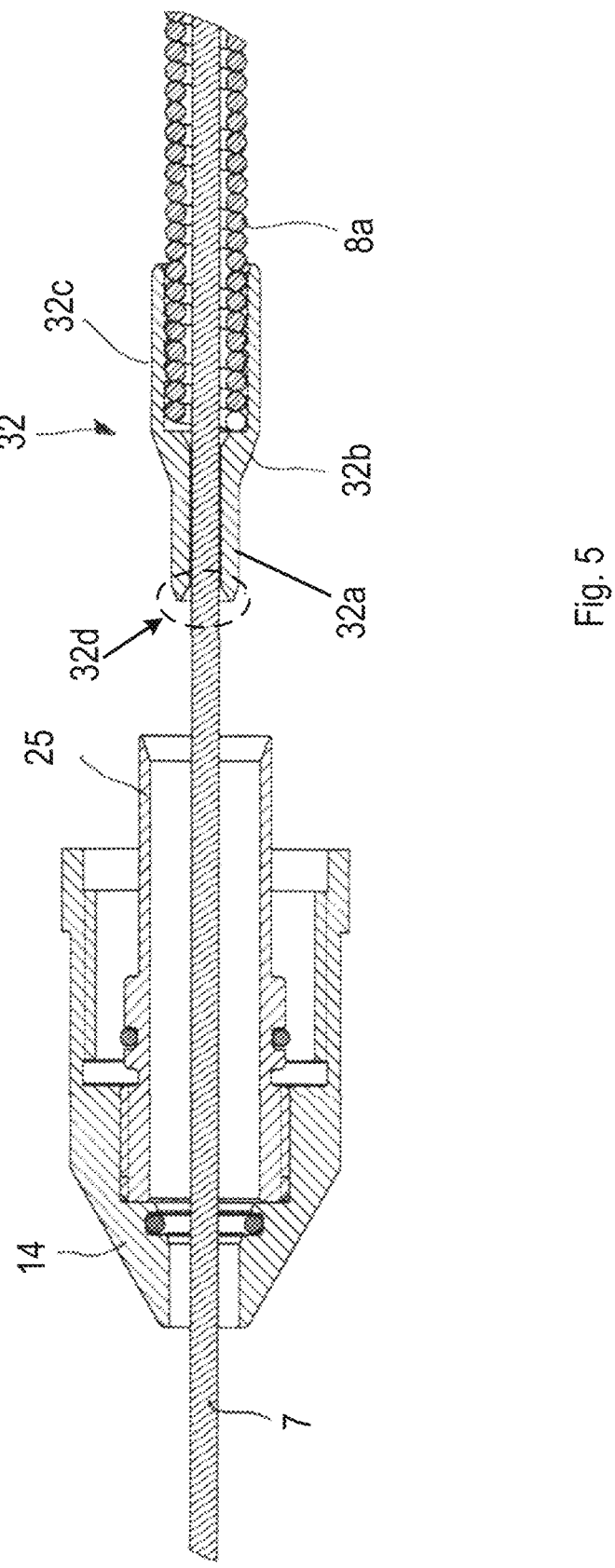
FIG. 5 is an exploded view of the detail of FIG. 4.

In the illustrations of FIGS. 4 and 5, a further preferred embodiment of the invention is shown. This is largely identical to the preferred embodiment of FIG. 1 to 3, which is why only the differences will be discussed below in order to avoid repetitions. The above description of FIG. 1 to 3 is therefore also incorporated by reference for the embodiment in FIGS. 4 and 5.

The main difference to the embodiment of an arc welding torch device according to FIG. 1-3 is that the guide element 32 has (only) one section 32c with a greater diameter, which has a continuous, constant diameter after its conical section 32b in the direction of the process end of the welding torch. In this preferred embodiment, there is no increase in diameter on the outer shell surface of the guide element following the conical section—and viewed in the direction of the process end—which could be used for a form-fitting and/or force-fitting holding of the guide element. In addition, in this preferred embodiment, no sealing element, such as the sealing element 33 of the other embodiment of FIGS. 2 and 3, rests against the outer circumference of the section 32c with a constant diameter. As such, there is also no sealing element between the inlet body 25 and the guide element 32 which could exert a holding force on the guide element 32. This has an advantage especially for changing the wire core 8a, since due to the lack of holding force on the guide element 32, the wire core and the guide element can be removed more easily—that is, with less effort—from the arc welding torch device towards the process end. However, since the arc welding torch devices according to the invention have signaling means with which the correct position can be checked by means of the signaling means, preferably during the entire use of the arc welding torch with a certain wire core, additional holding forces are also not absolutely necessary.

FIG. 6-13 show, among other things, a type of articulated arm robot 101 which is already used in many ways. The articulated arm robot 101 is designed as a so-called hollow shaft robot, which is particularly suitable in connection with the invention. Such suitable robots can be, for example, the robots of the AR or MA series, which are produced by the company Yaskawa Europe GmbH, 65760 Eschborn. The robot has a frame part 102 and an arm 103 which is arranged thereon and which is provided with a plurality of joints 104. The free end 105 of the arm of the articulated arm robot 101 is thus able to travel along any three-dimensional movement paths.

Figure 6:
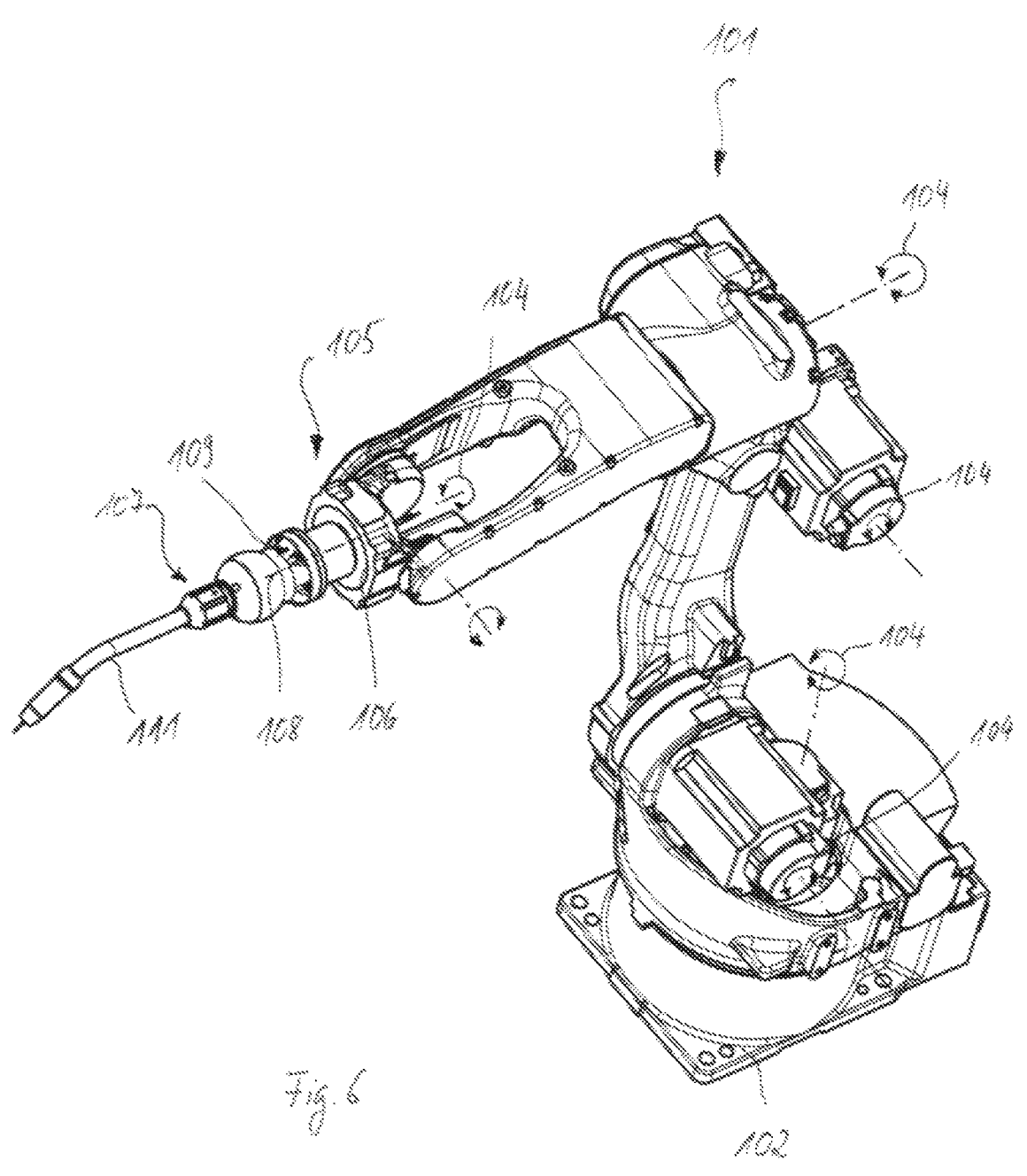
FIG. 6 is a highly schematic illustration of an articulated arm robot used as a welding robot.

At the free end 105 of the arm 103, the robot is provided with a connecting flange 106 of a connection device which is provided for receiving a welding torch 107 (FIG. 6) of the arc welding torch device. The connecting flange 106 can execute a motor-driven rotational movement about an axis of rotation 108 and relative to the last link of the arm 103. In FIG. 6, a spacer block is drawn in front of the welding torch, which serves as an extension of the connecting flange 106 of the robot and can be provided as a non-required option.

Figure 7:
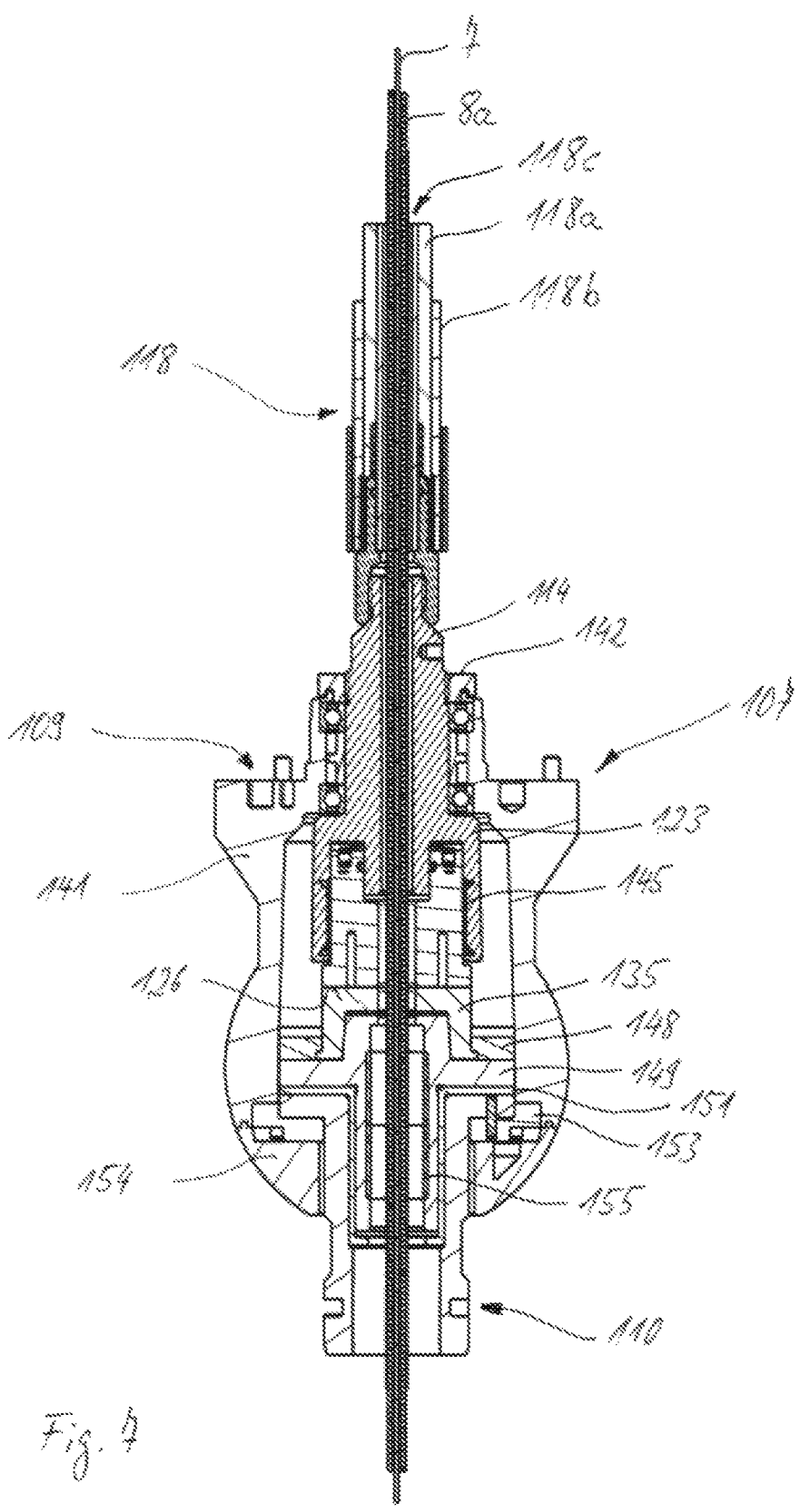
FIG. 7 is a highly schematic basic sectional illustration of an embodiment of a welding torch of an arc welding torch device.
Figure 8:
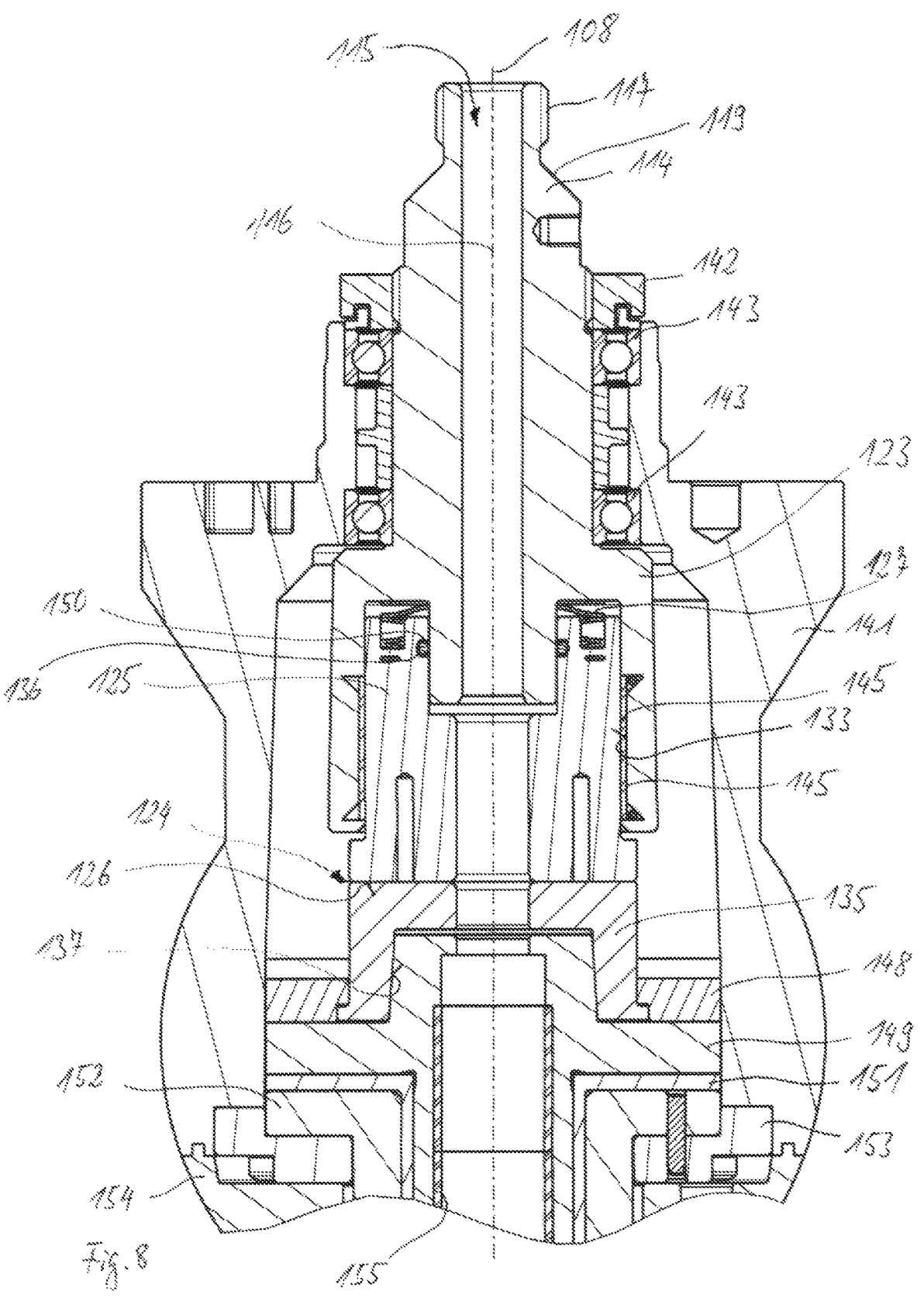
FIG. 8 is a more detailed illustration of the welding torch device of FIG. 7.
Figure 10:
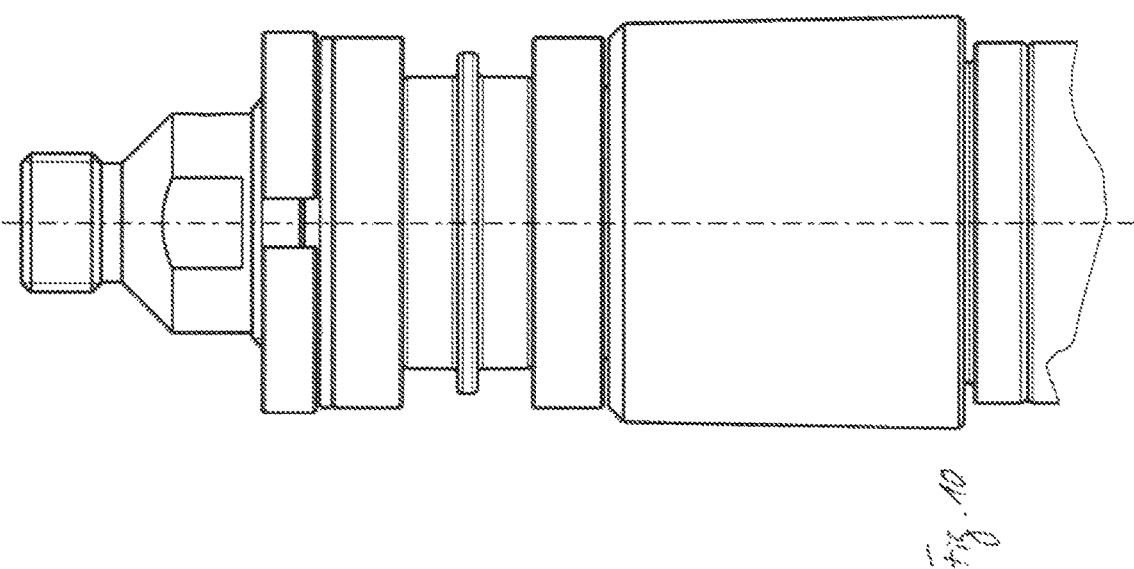
FIG. 10 is a side view of the assembly of FIG. 9.
Figure 9:
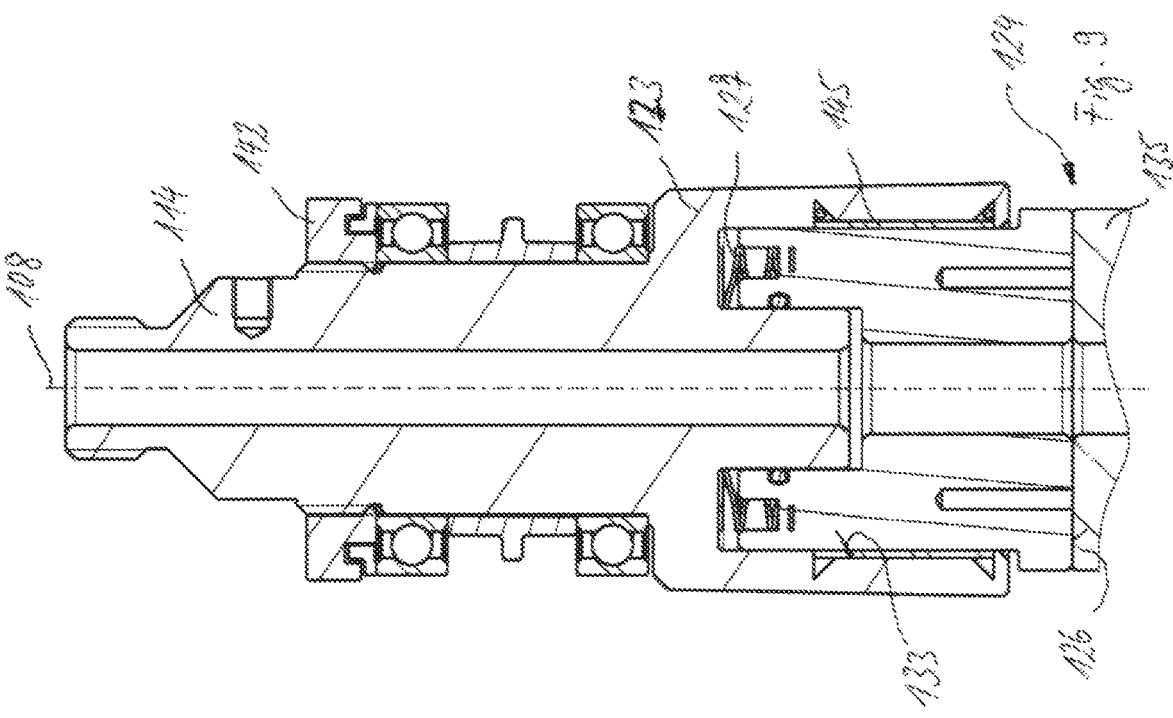
FIG. 9 is a stator of the welding torch device of FIG. 8 together with a sliding contact device, in a sectional view.

The arc welding torch 107 shown in more detail in FIG. 7 to 10 has a fastening device 109 and a receiving device 110 (FIG. 7). The fastening device 109 is provided to connect the welding torch 107 to the connecting flange 106 of the robot arm 103 in a detachable, but non-rotatable, manner. In contrast, the receiving device 110, together with a contact device, serves to receive a welding torch neck 111 of the welding torch 107 and to transmit the welding current to the welding torch neck 111. This transmission is explained in more detail below. Since the receiving device 110 can be connected non-rotatably to the connecting flange 106 of the robot, which executes rotational movements, via the fastening device 109, in a manner which will be explained in more detail below, the receiving device 110 and the fastening device 109 are also jointly referred to as part of a rotor which, by means of driven movements of the connecting flange about the axis of rotation 108, can perform such rotational movements. For this purpose, the rotor is non-rotatably connected to the connecting flange, and in particular is detachably connected.

The rotor can be rotated about the axis 108 relative to the last link of the robot arm 103 to which the connecting flange 106 is attached. The robot shown in the figures has a total of six driven axes, this number being only an example of the possible uses of the arc welding torch. In connection with the arc welding torch according to the invention, articulated arm robots with a different number of driven movement axes can also be used.

A stationary stator which is positioned inside of the rotor and the last link of the robot arm 103 has a tubular bushing 114 which is arranged centrally in the welding torch device and has a cylindrical recess 115. A longitudinal axis 116 of the recess 115 is aligned with the axis of rotation 108 of the connecting flange 106. The bushing 114 extends approximately over the entire length of the fastening device and the receiving device. The upper end of the bushing 114 on the robot side is provided with an external thread 117 serving as an electrical connection, onto which a coaxial cable 118 (FIGS. 6 and 7) can be detachably attached by being screwed thereon. In addition to the thread 117 of the bushing, a cone 119 (FIG. 8) can also be provided as a current-conducting contact between a welding current cable 118a of the coaxial cable 118 and the bushing 114. In the case of such a coaxial cable 118, the welding current cable 118a provided with an outer insulation 118b is arranged coaxially around a central channel 118c. The central channel 118c can serve to feed the welding wire 7 to the welding torch by means of a feed movement and to allow an inert gas to flow to the front end of the welding torch 107.

In the region of an end on the welding torch side, which is lower in the illustration, the bushing 114 is surrounded by a bell-shaped section 123 (FIGS. 8 and 9) of the stator which is circular in cross section and which is electrically conductively connected to the bushing. In the embodiment, the bell-shaped section 123 and the bushing 114 are connected in one piece. A contact device 124, which has a slip ring 125 arranged in the bell-shaped section, is arranged substantially inside the bell-shaped section 123 on the bushing 114. The contact device 124 has a contact surface 126 formed on the end face of the slip ring 125. On the one hand, the contact surface 126 is force-loaded by a compression spring 127 acting parallel to the longitudinal axis 116 of the bushing 114. The compression spring 127 is supported on the inside on the bell-shaped section 123 of the stator, and presses the contact surface 126 against a likewise substantially annular surface of a connecting bell 135. Both the annular surface of the connecting bell 135 and the contact surface 126 are components of a contact device 124, and are each arranged concentrically around the longitudinal axes 108, 116 and penetrated by a continuation of the recess 115.

Between the slip ring 125 and an inside of the bell-shaped section 123 there are contact segments 145 which establish the electrical contact between the slip ring 125 and the bell-shaped section 123. The spring action of the contact segments 145 has the effect that an electrical contact is established between the slip ring 125 and an inner surface 133 of the bell-shaped section 123. The material of the slip ring 125 is a good electrical conductor, for example copper or a copper alloy. The contact segments 145 can preferably accordingly be silver-plated in order to ensure particularly good electrical current transfer. The side of the slip ring 125 facing away from the compression spring 127 with its contact surface 126 (FIG. 9) is designed as a stationary component and as part of the stator, and acts as an electrical transition to the rotor to which the connecting bell 135 belongs, and which is rotatable about the longitudinal axis 108.

As such, the connecting bell 135 (FIG. 8), which is also electrically conductive due to a preferably silver-plated surface, adjoins the slip ring 125 in the direction of the longitudinal axis 116 of the bushing 114 and in the direction of the welding torch end. The bushing 114, the slip ring 125, and the connecting bell 135 have aligned central bores, which overall are part of a central recess 115 running along the longitudinal axis 108.

The compression spring 127 thus presses against the slip ring 125, which in turn presses via its contact surface 126 against the connecting bell 135; the latter is therefore constantly in contact with the contact surface 126—in particular, in electrically conductive contact. The connecting bell 135 is additionally secured in relation to its axial position on the bushing by means of a ring 148. Furthermore, the connecting bell 135 is paired with and is axially centered by the conical outer surface of the "brass flange with bushing" 149 via a conical, silver-plated inner surface. In addition, a seal 136 which makes it possible to ensure that the bell-shaped element 123 sits on the slip ring 125 in a gas-tight manner, as part of the stator, is located between the bell-shaped element 123 of the stator and the slip ring 125 in a groove 150 of the slip ring 125.

A "brass flange with bushing" 149, which is paired with the preferably silver-plated connecting bell 135 via a cone, is screwed via a plastic insulating sleeve 151 to a fastening element 152, which is part of the fastening device and serves as a counterpart for the welding torch connection.

The housing 141, an end cover 142 adjoining one end of the housing 141, and a cover 154 adjoining the other end of the housing 141 in the direction of the welding torch neck 111 are designed as plastic components in the embodiment. In the embodiment, the housing 141 also contains the fastening device 109 for fastening to the connecting flange 106 on a hollow shaft robot and, together with the cover 154 and the cover 142, electrically encloses and isolates the internal structure. The receiving device 110 of the welding torch is made of metallic, electrically conductive material, but it is also separated from current-carrying components via the plastic sleeve 151 with a flange as an insulator. The receiving device 110 for the welding torch is accordingly routed through the plastic housing 141 and the cover 154.

The fastening device 109 constructed as part of the plastic housing 141 is non-rotatably but detachably connected to the connection flange of the robot 106. The receiving device 110 for the welding torch, to the fastening element 152 of which a welding torch is detachably connected in a rotationally fixed manner, is also connected non-rotatably to the plastic housing 141. In principle, the housing 141 located on the outside of the welding torch is a component of the rotor of the arc welding torch. This rotor is arranged concentrically with the internal stator of the arc welding torch with respect to the axis of rotation 108, and can rotate about the latter due to motor-driven rotational movements of the connecting flange 106 of the robot relative to the internal stator. In contrast, the stator is stationary when the rotor moves together with the robot-side connecting flange 106, and does not rotate with it. In the embodiment, this stationary arrangement with respect to the connecting flange 106, the fastening device 109 and the rotor can be achieved overall, for example, by the welding cable being fastened to the thread 117 of the bushing 114 and being fixed in its rotative position due to the torsional rigidity of the welding cable. In other embodiments of the invention, an additional rotation lock of the stator on the robot can also be provided.

This makes it possible to transmit a rotary drive movement of the connecting flange 106 of the robot to the welding torch via the plastic housing 141, with the aid of a fastening ring 153 arranged in the housing 141 and the fastening element 152. The stator, however, does not perform this rotary movement, since it is rotationally fixed to the robot arm via the coaxial cable 118—and possibly via further fastening means. The resistance to torsion exhibited by such cables 118 can, however, already be sufficient to fix the stator, although a small proportion of the torque of the drive movement can possibly be transmitted to the stator via the bearings 143 due to frictional torques that cannot be completely ruled out. In the illustrated embodiment, the stator has at least the components: the bushing 114 and the slip ring 125, together with the compression spring 127. The rotor is mounted on the stator by means of bearings 143—in this embodiment, the ball bearings.

The plastic housing 141 is closed towards the welding torch with the cover 154, which covers the fastening ring 153. The housing 141 is covered towards the welding torch cable by the end cover 142. Should it appear necessary, the stator can also be additionally fixed to a rotationally fixed component of the robot, for example via the cover 142.

The electrical current required to carry out a welding process flows, proceeding from the welding current cable 118a, which is connected to the bushing 114 of the stator via the screw connection on the external thread 117, and continues in the stator to the bell-shaped section 123. There are contact segments 145 via which the current is transmitted to slip ring 125, which also belongs to the stator. The current is transmitted to the silver-plated connecting bell 135 via the sliding contact between the contact surface 126 and the connecting bell 135. The connecting bell 135 is part of the rotor and rotates with a driven rotational movement of the connecting flange 106, together with the housing 141, about the axis of rotation 108. The connecting bell 135 has, on an inner surface, a conical and likewise silver-coated surface 137 which is paired with a counter-cone of the brass flange 149 with bushing, and thus has a tightly pressed fit and accordingly good power transmission properties. In the brass bushing 149, there is a further, electrically conductive contact segment 155 X6, by means of which the welding current is transmitted to the welding torch via an inserted internal tube. The welding torch is fastened via the fastening element 152, which is insulated from the internal tube.

The shielding gas can flow via the coaxial cable 118 through the recess 115 of the bushing 114 to the welding torch neck 111. The welding wire 7 can also be fed to the welding torch neck 111 in the same way, and continuously advanced. If necessary, a data cable (not shown) can be integrated into the coaxial cable 118.

| List of reference symbols | |
| --- | --- |
| 1 | Arc welding torch |
| 2 | Jacket tube |
| 3 | Longitudinal axis |
| 4 | Torch neck |
| 5 | Welding process end |
| 6 | Rear end |
| 7 | Welding wire |
| 8a | Wire core |

-continued

| List of reference symbols | |
| --- | --- |
| 9 | Duct |
| 10 | Drive roller |
| 11 | Drive roller |
| 12 | Wire feed device |
| 13 | Housing |
| 14 | End cap |
| 14a | Conical section |
| 14 | Cylindrical section |
| 16 | Open through-bore |
| 17 | Stepped central recess |
| 18 | Greater diameter |
| 18a | Inner thread |
| 19 | Smaller diameter |
| 19a | Inner thread |
| 20 | End face |
| 21 | Outer shoulder |
| 23 | Inner diameter of 2 |
| 24 | Through-recess of 2 |
| 25 | Sleeve-shaped inlet body |
| 25a | Through-recess |
| 25b | Cut-in/groove |
| 26 | Shoulder |
| 28 | Cut-in/groove |
| 29 | Sealing element |
| 30 | External thread (of 25) |
| 32 | Guide element |
| 32a | End/end region |
| 32b | Conical section |
| 32c | Section |
| 33 | Sealing element |
| 34 | Through-recess |
| 34a | Shoulder |
| 35 | Cut-in |
| 36 | Threadless section |
| 37 | Section with a smaller |
| 38 | Shoulder |
| 39 | External thread (of 2) |
| 101 | Articulated robot |
| 102 | Frame |
| 103 | Arm |
| 104 | Link |
| 105 | Free end |
| 106 | Connecting flange |
| 107 | Welding torch |
| 108 | Axis of rotation |
| 109 | Fastening device |
| 110 | Receiving device |
| 111 | Welding torch neck |
| 114 | Bushing |
| 114a | Longitudinal groove |
| 115 | Recess |
| 116 | Longitudinal axis |
| 117 | External thread |
| 118 | Coaxial cable |
| 118a | Welding current cable |
| 118b | External insulation |
| 118c | Channel |
| 119 | Cone |
| 123 | Bell-shaped section |
| 124 | Contact device |
| 125 | Slip ring |
| 126 | Contact surface |
| 127 | Compression spring |
| 128 | ~~Slip contact element~~ |
| 129 | Recess |
| 130 | Compression spring |
| 133 | Inner surface |
| 134 | Contact surface |
| 135 | Connecting bell (silver-plated) |
| 136 | Seal |
| 137 | Flange surface |
| 141 | Plastic housing |
| 142 | End cover |
| 142a | Bore |
| 143 | Bearing |
| 145 | Contact segment |
| 148 | Ring |

-continued

| List of reference symbols | |
| --- | --- |
| 149 | Brass flange with bushing |
| 150 | Groove (of 126) |
| 151 | Plastic sleeve |
| 152 | Fastening element |
| 153 | Fastening ring |
| 154 | Cover |
| 155 | Contact segment |

The invention claimed is:

1. An arc welding torch comprising:
a jacket tube;
an end cap arranged at a rear end of the arc welding torch, the end cap abutting the jacket tube;
a guide element movable along a longitudinal axis of the jacket tube, the guide element having an end region having a first diameter and an enlarged region having a second diameter that is larger than the first diameter, the guide element configured to receive and guide a consumable electrode; and
an exchangeable wire core arranged in the enlarged region of the guide element,
wherein the consumable electrode is guidable in the exchangeable wire core from a rear end to a welding process end of the arc welding torch, and
wherein the consumable electrode is consumable at the welding process end during an arc welding process.

2. The arc welding torch according to claim 1, wherein an end portion of the end region is an anti-kink means to prevent kinking of the consumable electrode, the anti-kink means arranged between the end cap and a wire feed means.

3. The arc welding torch according to claim 2, wherein the anti-kink means protrudes from a through-bore in the end cap of the arc welding torch device.

4. The arc welding torch according to claim 1, wherein the guide element is formed in one piece and includes a receptacle for a wire core arranged within the arc welding torch device.

5. The arc welding torch according to claim 2, wherein the anti-kink means is arranged without a connection on the arc welding torch device.

6. The arc welding torch according to claim 2, wherein the anti-kink means and the guide element are detachably fixed within the arc welding torch device.

7. The arc welding torch according to claim 2, wherein the anti-kink means is arranged in a predetermined position in the arc welding torch device due to a positive-fitting arrangement of the anti-kink means in the axial direction in the arc welding torch device.

8. The arc welding torch according to claim 2, wherein the anti-kink means is sleeve-shaped.

9. The arc welding torch according to claim 3, wherein a maximum outside diameter of the anti-kink means protruding from the through-bore is smaller than the diameter of the through-bore of the end cap.

10. The arc welding torch according to claim 1, which is provided for arrangement on a welding robot which has a robot arm on which a connection device is provided which is rotatable relative to the robot arm, the welding robot comprising:
a fastening device for attaching the welding torch to the welding robot,
a receiving device for holding the welding torch and for the transmission of driven rotary movements to the welding torch, an electrical connection for a welding current cable where the welding torch device can be electrically connected to a welding current source, and a power transmission device via which the welding current cable can be electrically connected to a welding torch side of the welding torch device, wherein the power transmission device has a stator which is provided for a rotationally fixed arrangement relative to the robot arm, but which is rotatable relative to the connection device on the welding robot side, wherein a bushing of the stator through which at least one of the consumables required for the welding process can be passed in the direction of the receiving device, wherein the receiving device and the fastening device are designed as a rotor, and are accordingly rotatable relative to the stator, and the receiving device and/or the fastening device can be connected to the stator in an electrically conductive manner by means of an electrical contact device, and wherein the fastening device of the rotor is designed for attachment to the connection device of the robot, and due to the attachment to the connection device of the robot, an axis of rotation of the rotor is at least substantially aligned with the axis of rotation of the connection device of the robot, and the rotor can be rotated about the axis of rotation and about the stator.

11. The arc welding torch according to claim 10, wherein a recess running along the axis of rotation of the rotor, which runs centrally with respect to the axis of rotation both through the fastening device and through the receiving device, wherein both an inlet opening of the recess in the stator and an outlet opening of the recess in the rotor are also arranged centrally with respect to the axis of rotation.

12. The arc welding torch according to claim 1, wherein an end portion of the end region is beveled and extends through the end cap such that the beveled end portion protrudes from the end cap to facilitate entry of the consumable electrode and to prevent kinking of the consumable electrode.

13. The arc welding torch according to claim 1, further comprising:

a sleeve-shaped inlet body, and a sealing element arranged on a section of an outer surface of the guide element with the second diameter, wherein the sleeve-shaped inlet body is provided with a cylindrical recess, and wherein the section is located within the cylindrical recess of the inlet body.

14. The arc welding torch according to claim 1, further comprising a sleeve-shaped inlet body, wherein the guide element is arranged in the inlet body in a force-fitting or form-fitting manner.

15. The arc welding torch according to claim 1, further comprising a sleeve-shaped inlet body, wherein the inlet body is provided on an inner surface with a recess or a groove in which a sealing element is arranged, wherein the sealing element is in contact with an outer surface of the guide element.

* * * * *